INVENTORS
ANDOR BUDINCSEVITS
ERNŐ WINTER
BY Blum, Moscovitz, Friedman & Blum
ATTORNEYS INVENTORS
ANDOR BUDINCSEVITS
ERNÓ WINTER
BY
*Mock & Blum*
ATTORNEYS

2,931,934

INDIRECTLY HEATED SUPPLY CATHODE

Andor Budincsevits and Ernö Winter, Budapest, Hungary, assignors to Egyesült Izzolámpa és Villamossági Reszvénytársaság, Budapest, Hungary Application February 1, 1956, Serial No. 562,875

Claims priority, application Hungary February 5, 1955

25 Claims. (Cl. 313—217)

This invention relates to supply cathodes of the type comprising a metallic base body, electrical heating means insulated from said base body and positioned inside of said base body, a supply of an activating substance adapted to yield the active electron-emitting material of the cathode, said supply being provided on said metallic base body in such a manner that the wall of said body is interposed between said heating means and said supply substance, and a permeable composite metallic body in contact with said activating supply substance and adapted to allow passage of the active electron-emitting material to the electron-emitting surface of the supply cathode, said electron-emitting surface being the outermost surface of said composite metallic body permeable to the electron-emitting active material originating from said activating supply substance, said material forming on the outermost surface of said permeable composite body an electron-emitting layer of substantially at most molecular thickness, cathodes of this type being shortly termed in the art "indirectly heated supply cathodes."

In a special embodiment of the indirectly heated supply cathodes shortly termed in the art "L-cathodes," the permeable composite metallic body allowing passage of the electron-emitting active material from the supply substance to the electron-emitting surface of the cathode consists of a refractory porous metallic body, the pores of said body forming the passages owing to the presence of which said body is permeable to the electron-emitting active substance, said composite metallic body consisting usually of sintered tungsten.

The invention is mainly based on our having ascertained that most of the theories tending to explain the functioning mechanism of the "L-cathodes" are most probably incorrect. The publications of the authors who have developed "L-cathodes" containing rather contradictory statements relating to these cathodes, a controversy is still going on in the scientific and technical literature dealing with this subject as to whether in cathodes of this type barium oxide is really evaporating or not and in the affirmative, to which extent and as to whether the barium oxide is instrumental in causing electron-emission from these cathodes or not, i.e. whether these cathode constitute cathodes of the oxide cathode or of the barium film cathode type, and whether the evaporation of barium oxide is essential or not.

According to what we have ascertained, the vapor pressure of barium oxide is essential for the correct functioning of the "L-cathodes," and the vapor pressure of the supply material yielding the electron-emitting active material has to be inferior to the vapor pressure of barium oxide itself, in order to obtain satisfactory lengths of service life of these cathodes. The manner in which this result may be achieved, is described in detail in the copending application Serial No. 429,955, now Patent No. 2,902,621 of one of the present inventors, Ernö Winter, and assigned to the assignee of this application.

We have however recently ascertained that the various problems of the "L-cathodes" are by no means restlessly solved by the suitable adjustment of the vapor-pressures according to application Serial No. 429,955, now Patent No. 2,902,621, as most of the drawbacks and difficulties met in connection with these cathodes are due to the presence of the sintered porous refractory body and the constructions necessitated by the peculiarities and the possibility of manufacture of this porous tungsten body, which cannot be manufactured in quite small sizes and cannot be mounted in the cathode in any desired manner, as well known to those skilled in the art. The substantial thickness of the wall of said porous tungsten body is apt to cause many difficulties including a temperature gradient which renders suitable adjustment of the various working temperatures determining the various vapor-pressures referred to above as well as the formation of the electron-emitting active material, and also the emission of the cathode, very difficult and even impossible in many cases. In order to explain this, it has to be stated that the outermost surface of this sintered porous tungsten body has to be held at a fairly high operating temperature in order to obtain suitable electron-emission of the cathode. This temperature, however, cannot be easily brought into a suitable relation with the operating temperature of the supply substance necessary to obtain the reduction yielding the electron-emitting material from said substance. In case of using strong reducing agents yielding this material, usually barium, already at relatively low temperatures, it is impossible to heat the porous body to the temperature necessary for obtaining suitable electron-emission without overheating of the supply substance to an extent unduly accelerating the reduction and thereby causing unduly rapid exhaustion of the supply substance. If a weak reducing agent, such as molybdenum, yielding barium by reduction only at more elevated temperatures, is used, it is possible to heat the electron-emitting surface of the porous body to the temperature necessary for suitable electron-emission without unduly accelerating the reduction, but heavy heating current consumption and severe thermal strain of the heating filament are unavoidable in this case.

In order to obviate the necessity of using a sintered refractory porous metal body as permeable composite metallic body of a supply cathode, and the necessity of a vacuum-tight closure of the chamber containing the activating supply substance, in a manner that said substance may leave said chamber only through the pores of said sintered refractory metal body, the use of a composite metallic body allowing passage of the electron-emitting active material by surface migration might have been considered, on the basis of the disclosure contained in the U.S. Patent No. 2,107,945 and in the French Patent No. 907,226. This solution of the problem, however, appeared discouraging, according especially to the content of lines 42 to 52 of page 1 of the specification of the French patent and also to the content of lines 35 to 66 of page 2 of the specification and of Fig. 8 of the drawing of the U.S. Patent No. 2,107,945. Contrary to what might be expected on grounds of these disclosures, and having overcome the prejudice needs caused by them, we have ascertained that by ensuring suitable surface migration of the electron-emitting active material from the supply to the electron-emitting active surface instead of passage through the pores of a refractory sintered porous metallic body, excellent results and many other important advantages may be achieved, and this is the basis of our present invention.

Accordingly, it is an object of the invention to provide a supply cathode of the type specified, in which cathode the permeable composite metallic body in contact with the activating substance yielding the electron-emitting active material is a non-porous composite metallic structure allowing passage of the electron-emitting active material to the emitting surface of the cathode only by surface migration, obviating thereby the drawbacks associated with composite porous permeable metallic bodies consisting of sintered refractory metal particles.

It is further object of the invention to provide a supply cathode of the type specified which is suitable for mass production and may be manufactured to very close limits of mechanical as well as electrical tolerance.

It is another object of the invention to provide a supply cathode of the type specified, which has a long service life, moderate heating current consumption and is suitable for use as an impulse cathode adapted to bear heavy loads.

It is also an object of the invention to provide a supply cathode of the type specified which may be used in radio reception tubes without the drawbacks caused by interface layers usually formed in cathodes of the oxide cathode type, and being devoid of the troublesome noise-effect, shortly termed "flicker" in the art, of the conventional oxide cathodes.

Finally, it is also an object of the invention to provide a supply cathode which when used in radio reception tubes is adapted to lowering the noise level of such electron tubes, and to showing very small surface resistance and being practically devoid of the danger of sparking.

With these and other objects in view, the main feature of the invention is its use of composite permeable metallic bodies consisting of a plurality of individual members contacting with each other and allowing the passage of the electron-emitting active material from the supply to the actual emitting surface of the cathode by surface migration taking place along the contacting surfaces of the individual members constituting said permeable composite metallic body, at least one of the individual members of said composite body directly contacting with the metallic base body of the cathode and with the supply substance arranged on said base body.

Another preferred feature of the invention is its use of composite metallic permeable bodies of a thickness amounting at most to 100 microns, and being preferably below $50\mu$, in the range of say $20\mu$ to $50\mu$, in order to ensure close proximity of the electron-emitting surface of the cathode to the supply substance and in consequence thereof substantially equal operating temperatures of these, as well as short migration pathways, always ensuring sufficient supply of active material by migration to the electron-emitting surface of the cathode.

In a preferred embodiment of the invention the composite permeable metallic body consists of superposed wire helices, each of these being so closely wound that their adjacent turns contact with each-other, leaving no perceptible gaps between these adjacent turns, and superposing being effected in such a manner that the total thickness of the wall of the composite body formed by these superposed wire helices is less than the total sum of the diameters of the wires constituting said helices.

In another preferred embodiment of the invention the composite permeable metallic body consists of superposed metallic foils provided with very fine apertures, perforations or the like, superposing being effected in such a manner that the apertures of the contacting foils should not register with each other to constitute direct passageways from one side of the composite body to the other, but to allow the passage of the active material only by surface migration along the contacting surfaces of said foils and the walls of said perforations. Said foils may be plane, or constitute cylindrical or other mantle surfaces, according to the shape and arrangement of the body of the cathode.

Other features of the invention will be apparent from its following detailed description.

The invention will be explained in detail in connection with its embodiments illustrated in the accompanying drawings in which.

Figure 1:
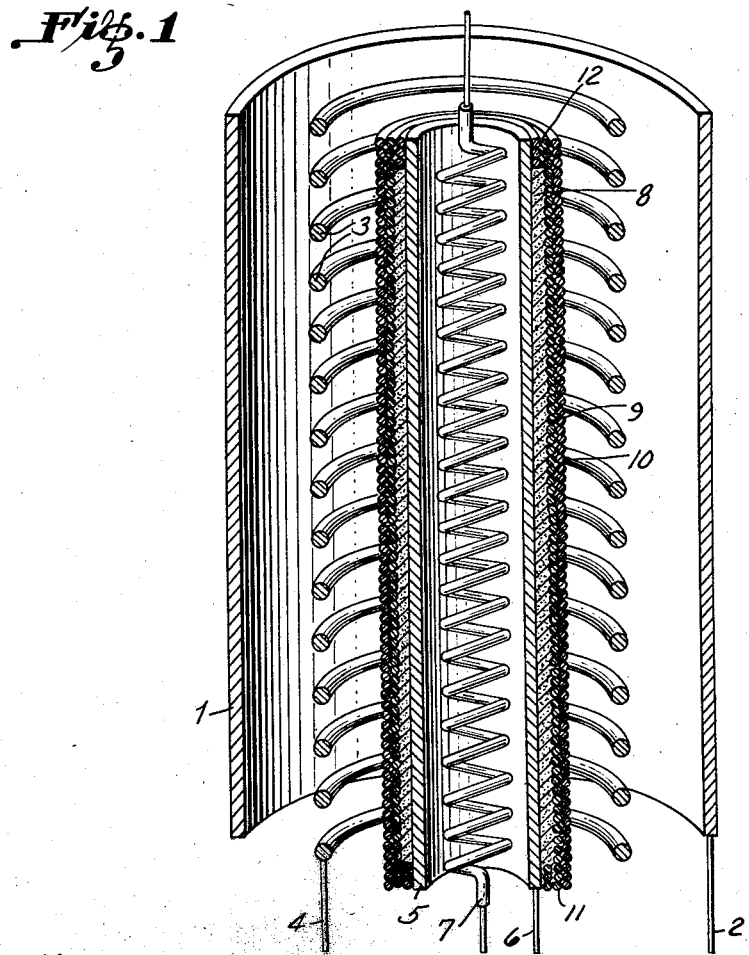
Fig. 1 is a diagrammatic longitudinal section of the electrode system of an electron discharge device containing a cathode embodying the invention.

Referring now to Fig. 1, the electrode system shown comprises the conventional anode 1 provided with the conductor 2, the conventional grid 3 provided with the conductor 4 and a supply cathode according to the invention, the tubular metallic base body 5 of which is provided with the conductor 6. This cathode is heated by the conventional heater element 7 consisting of a helically wound tungsten wire provided with the usual insulating coating of alumina or the like. The tubular base body 5 may consist of nickel or of the nickel alloy used in the art for manufacturing the cathode bodies of conventional oxide cathodes. This tubular base body 5 may, however, consist of tungsten, molybdenum, iron or other suitable metal or alloy. The supply of activating material is provided on this tubular body 5 on the outer surface of the same in the shape of a cylindrical layer 8 of substantially uniform thickness. This supply of activating material may consist of any suitable compound or alloy of earth alkaline metals, for example of a mixture of barium oxide, strontium oxide and calcium oxide. The permeable composite metallic body contacting with said activating substance 8 consists of two superposed wire helices, the inner of these helices directly contacting with the supply material being designated by 9 and the outer of these helices, superposed on the helix 9, is designated by 10. As shown on the drawing, these helices are arranged in a manner that their adjacent turns closely contact with each other, leaving no perceptible gaps between them and the turns of the helix 10 are disposed midways between the turns of the helix 9 in order to ensure that the total thickness of the permeable composite body formed by the helices 9 and 10 is less than the double of the diameter of the wires forming these helices, and that eventual gaps between the adjacent turns of the helix 9 are covered by the turns of the helix 10, tightly wound onto the helix 9 in order to allow the passage of active material through the composite metallic body formed by helices 9 and 10 only by surface migration. At the ends of the tube 5 some turns of the wire designated at the lower end of the tube by 11 and at the upper end of the tube by 12 are wound directly on the tube 5, thus completely enclosing the supply material 8 which can escape only by surface migration along the surfaces of the wires forming the helices 9 and 10 and the turns 11 and 12. As can be seen from the drawing, the wires constituting the composite permeable metallic body allowing the passage of the active electron emitting material to the electron-emitting surface of the supply cathode are in direct metallic contact with the tubular cathode body 5, by means of the turns 11 and 12. The electron-emitting active surface of this supply cathode is the exposed outermost surface of the helix 10, which is coated by a very thin layer of electron-emitting active material, the thickness of said layer being substantially atomic or at most molecular.

Figure 2:
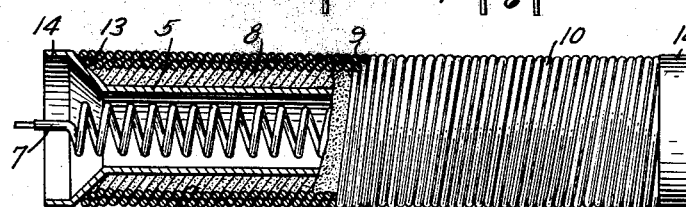
Fig. 2 is a longitudinal part-section and a side elevational view of another embodiment of the cathode according to the invention.

On the embodiment of the cathode shown on Fig. 2, the heating filament 7 is substantially identical with that shown on Fig. 1, but the tubular base body 5 of the cathode is enlarged at both ends, conical parts 13 merging into cylindrical parts 14 respectively 14' of a diameter substantially exceeding the diameter of the tubular middle part. The activating supply substance 8 is provided on the cylindrical middle part of the cathode body and covered by the inner wire helix 9 on which the outer wire helix 10 is disposed in the manner explained in connection with Fig. 1 and shown also by Fig. 2, the final turns of the helices 9 and 10 contacting with the conical parts 13 of the cathode body, thus completely enclosing the supply material 8. Instead of two superposed wire helices also three superposed wire helices may be used and instead of being formed by wires of circular cross-section, these helices may also be formed of flat bands or wires of oval or other suitable cross-section. The wires or bands forming these helices may consist of tungsten, molybdenum, tantalum, niobium or nickel. As shown by Figs. 1 and 2, the thickness of the layer 8 of the activating supply substance is substantially equal to the thickness of the composite permeable metallic body formed by the helices 9 and 10. In practice the diameters of the wires forming these helices are preferably between 10 and 30μ and usually not in excess of 50μ. In order to increase the surface of the migration paths it is generally preferable to use very fine wires of a diameter of about 10μ, but these wires may in some cases, for example on impulse cathodes, be subjected to the danger of being burned by sparking. Therefore in the case of cathodes subjected to this danger wires of about 20 to 30μ may be used. The ends of the wires are fastened to the cathode body by welding, effected in any suitable conventional manner.

With this construction of the cathode, the activating material may pass to the electron-emitting surface of the cathode only by surface migration, as the adjacent turns of the helices 9 and 10 contact with each other closely and the eventual gaps present between some turns of the helix 9 are covered by the turns of the helix 10. The migration surfaces may be increased by lessening the preferably equal diameters of the wires forming the helices 9 and 10. Our examinations have shown that the electron-emitting active surface of the cathodes shown on Figs. 1 and 2 most probably consists of a very thin layer of alkaline earth metal oxide on the outer surface of the helix 10 and a mono-atomic or at most molecular layer of metallic alkaline earth metal, usually barium, superposed on said layer of oxide. These layers being very thin, they adhere very strongly to their base and can bear very heavy impulse-like loads without damage. In case of any loss of active substance this is very soon replenished from the supply, because owing to the good heat-conducting contact of the helices 9 and 10 with the metallic cathode body 5, the working temperatures of the electron-emitting active surface of the helix 10 and of the supply material 8 are substantially equal, thus ensuring substantially equal earth alkaline metal, usually barium, vapor pressure in the supply material 8 and on the electron-emitting active surface. Owing to the fact that the supply material 8 is in immediate contact with the cathode body 5 as well as with the helix 9 and the helix 9 is in metallic contact with the cathode body 5, the formation of interface layers is practically prevented and the drawbacks due to such interface layers are obviated. We have further ascertained that the troublesome noise effect termed "flicker" is also absent and the general noise level is generally very low. These cathodes have further been found to be practically immune to the troublesome sparking often taking place in case of impulse cathodes. We have also ascertained that if the electron-emitting active surface of the cathode suffers by impulse-like heavy overloads, not only metallic active material but also oxides of alkaline earth metals, such as barium oxide, migrate from the supply to the electron-emitting active surface of the cathode and re-form the same to full activity. This is probably due to the effect that owing to the construction and the operating temperature of the cathode no perceptible evaporation of activating material takes place, but the activating materials migrate only on the migration paths provided for them, being bound to migration on these surfaces. They seem to behave similarly as two-dimensional gases would behave, and owing to this special mechanism of replenishment of the electron-emitting active surface we propose to term the cathode according to our invention as "M-cathode." This migration depends on a plurality of factors and by suitable choosing of these may always be adjusted in a manner to ensure sufficient replenishing of the electron emitting active material of the surface of the cathode and therefore to obviate the troublesome drop of the curve A shown on Fig. 8 of U.S. Patent No. 2,107,945. We wish to point out, however, that although we believe the theories set forth above to be correct, the invention is untouched by their eventual incorrectness, as the favourable results obtained with these cathodes may also have other explanations, but are facts, and may always be obtained on grounds of some preliminary experiments determining optimum values.

Figure 3:
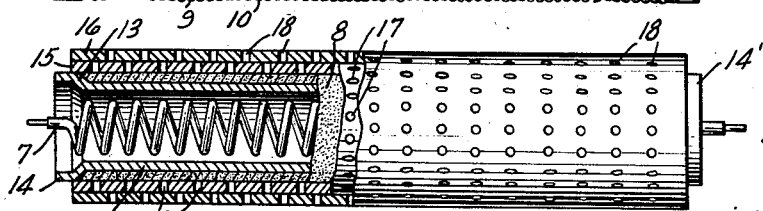
Fig. 3 is a longitudinal part-section and a side elevational view of a further embodiment of a cathode according to the invention.

On the embodiment of the cathode shown on Fig. 3 the tubular metallic base body 5 of the cathode is similar in shape to that shown on Fig. 2 with the difference that the diameter of the cylindrical parts 14 and 14' does not exceed the diameter of the part 5 by more than the double thickness of the layer 8 of activating supply material. The composite permeable metallic body allowing passage of electron emittive active material by surface migration consists of two thin metallic tubes 15 and 16. The inner tube 15 exactly fits the cylindrical parts 14 and 14' of the cathode body 5 and is preferably fastened to the same by conventional welding, and the outer tube 16 also fits the inner tube 15 exactly and may also be fastened to the same by welding. The inner tube is provided with the perforations 17 and the outer tube with the perforations 18 and the tubes are in such relative position that these perforations do not register with each other and do not constitute free passages between the supply material 8 and the outside of the cathode, but allow passage of activating material only by surface migration on the contacting surfaces of the tubes 15 and 16 and the surfaces of their perforations. The drawing shows the perforations 17 and 18 in strongly enlarged scale, their actual diameter being preferably in the order of 1 to 10μ and the walls of the tubes may be of a thickness of about 20 to 40μ. The number of perforations used in actual practice also substantially exceeds that shown on Fig. 3, and it is also possible to use three superposed cylindrical bodies with perforated surfaces instead of the two such bodies shown on Fig. 3 of the drawing. Instead of such superposed cylindrical bodies woven structures consisting of very fine wires may also be used, for example of the kind shown on Fig. 3 of the U.S. Patent No. 2,107,945, it being only essential to adjust the heat conductive capacity, the working temperatures and the total migration area in such a manner that untroubled replenishing of activating material and substantially equal vapor pressures of the active electron-emitting material on the cathode surface and of the supply material should be ensured.

On Figs. 1 to 3 cathode bodies 5 of circular cross-sections are illustrated, but it is obvious to those skilled in the art that any suitable cross-section and also variable cross-sections of the cathode bodies may be used.

The cathodes shown on Figs. 1 to 3 are especially suitable for high-vacuum radio-reception tubes, in which they may be mounted in exactly the same manner as the conventional oxide cathodes used up to now have been mounted in these tubes. Owing to the presence of the cathode body 5, which can be manufactured to very narrow limits of tolerance, the cathodes may be manufactured very exactly and used in electronic devices where the clearance between the cathode and the grid amounts to only 30 to 40μ, which has not been possible with supply cathodes known up to now. The heating current consumption of these cathodes is also very favorable in comparison to the supply cathodes known up to now. As an example it may be stated that the heating power consumption, for a certain given output of electronic emission, of the supply cathodes known as L-cathodes amounts to about 30 to 35 watts, whereas the heating current consumption of the cathodes according to our invention amounts to only about 15 to 16 watts, i.e. does not exceed the double of the heating current consumption of very good oxide cathodes, amounting, for the same output, to about 8 to 10 watts.

Figure 4:
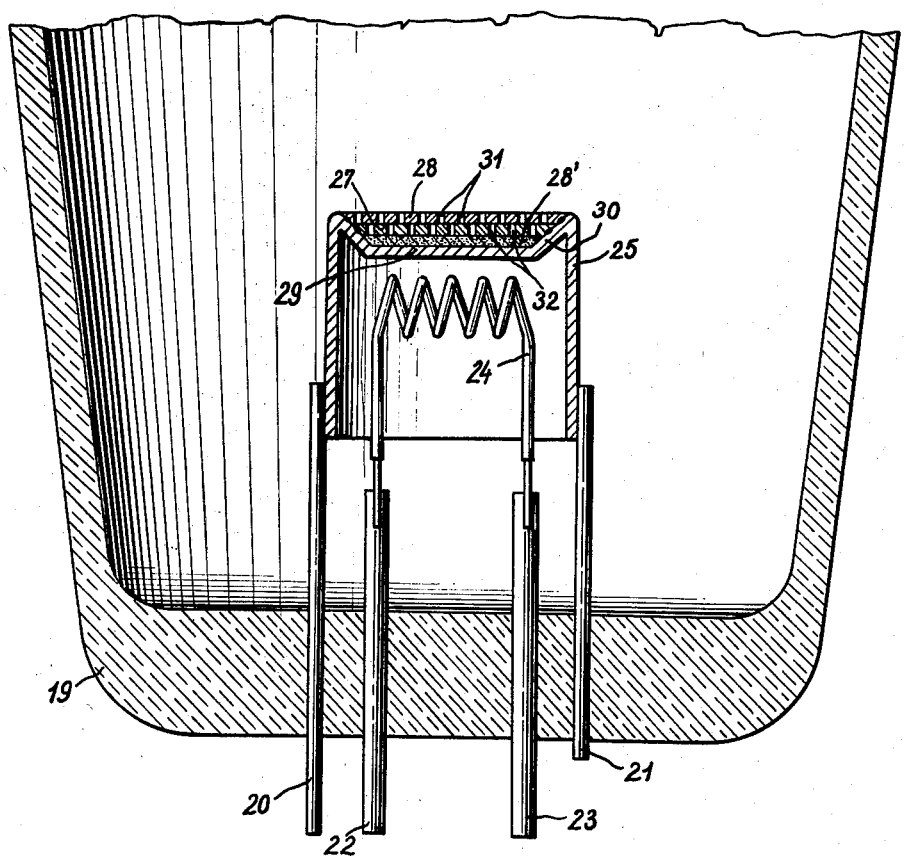
Fig. 4 is a partial diagrammatic section of a cathode-ray tube provided with a cathode according to the invention and Fig. 5 is a perspective view, partly in section, of the cathode shown in section on Fig. 4.
Figure 5:
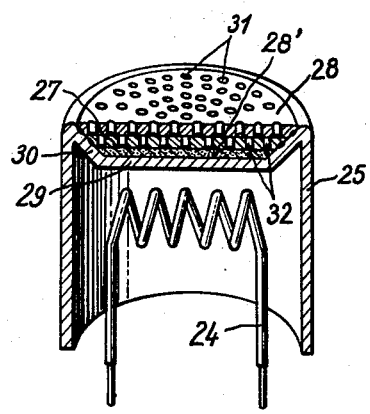

The supply cathode according to the invention may also be manufactured to be provided with a plane electron-emitting surface, as usual, for example, in cathode-ray television or other cathode-ray tubes. An example of such a cathode is shown on Figs. 4 and 5. The envelope 19 of glass of the cathode-ray tube is provided with the conductors 20 and 21 sealed into the container in any convenient manner and holding the cathode base body 25 of substantially cylindrical shape. Heating of this cathode is effected by the helical heater 24 provided with the usual insulating coating, heating current being supplied to it by the conductors 22 and 23 also sealed into the envelope 19 in any convenient manner. The cathode body 25 is provided with a recess formed by the substantially plane bottom part 29 together with the substantially conical part 30. The supply material 28' is provided on the bottom of the recess thus formed and is covered by the thin metallic plates 27 and 28. These thin metallic plates are provided with perforations 32 respectively 31, and disposed in such a manner that these perforations should not register with each other. These metallic plates are fastened to the cathode body 25 by welding and together constitute the permeable composite metallic body allowing passage of the activating material to the electron-emitting surface of the cathode only by surface migration. The thickness of these metallic plates 27 and 28 and the dimension of the perforations 31 respectively 32, may be of the same order as that stated in connection with the cylindrical bodies of the cathode according to Fig. 3. The cathode body 25 may also be shaped differently in order to form a recess containing only the supply substance and the plates 27 and 28 may be shaped as covering the cathode body and contacting only with the rim of the cathode body, being fastened to same by welding.

The activating supply substance of the cathode according to the invention may also consist of other substances than those mentioned above. In the case of the cathodes according to Figs. 1 to 2 it has been found that mixtures of barium oxide, strontium oxide and calcium oxide, preferably in the molecular proportions of 2:1:2, and used in the shape of carbonates with a cellulosic binder are very suitable, because the wire helices may be wound on such a coating consisting of a mixture of these carbonates with a suitable cellulosic binder without any drawback, in contradiction to the statement contained in the French Patent No. 907,226. The decomposition of the carbonates to oxides may be effected by heating while the tube is on the pump, in the usual manner, but activating the cathode takes more time than usual, because time is needed for the migration of the formed active material to the electron-emitting surface of the cathode. This, however, does not delay production, because this migration can take place during the usual aging of the tubes and is usually finished inside of 20 to 30 minutes, whereas aging, as well known, takes usually at least 1 to 2 hours.

Instead of the substances mentioned above, other compounds may also be used, for example those described in the copending application Ser. No. 429,955, now Patent No. 2,902,621, of one of the present inventors, Ernö Winter, these compounds being the compounds of an alkali earth metal, preferably barium, with oxygen and at least one of the elements of the group of elements comprising: beryllium, titanium, strontium, zirconium, aluminium, rare earths. Instead of effecting reduction by means of the metal or metals contacting the activating supply substance, said metals being the metal of the cathode body or the metal of the permeable composite metallic body, it is also possible to effect reduction by reducing agents admixed to the activating supply substance. The reducing agent may be a weak reducing agent such as molybdenum, used in connection with barium oxide, or we may also use a strong reducing agent, such as silicium, together with a suitable barium compound, or a reducing agent of medium strength, such as aluminium. It is also possible to use alloys of barium, for example barium-aluminium or barium-beryllium alloys or the alloys of barium with rare earths such as scandium, yttrium and lanthanum or the alloys described in the copending application Ser. No. 465,489 of one of the present inventors Ernö Winter, now Patent No. 2,798,180 granted July 2, 1957. It is also possible to make the permeable composite metallic body of molybdenum, niobium or nickel and to coat it on its surface with one of the metals of the platinum group, preferably platinum, similarly to the manner described in connection with porous bodies in the copending applications Ser. No. 429,954 and Ser. No. 465,489 (now Patent No. 2,798,180, granted July 2, 1957), of one of the present inventors, Ernö Winter, and both assigned to the assignee of this application. In the present case such coating may not only prevent undue chemical reaction between the composite permeable metallic body and the activating supply substance, but also allow increased surface migration owing to the peculiar qualities of the surfaces of the metals of the platinum group.

By suitably choosing the supply substance or the metals contacting with it from those mentioned above, and adjusting the working temperatures of the different parts of the cathode accordingly, for example between 850 and 1150° C., especially around 900° C., it is practically always possible to ensure the correct vapor pressures and reaction mechanisms necessary to obtain suitable emission, long service life, speedy replenishing and all the other advantages of the cathodes according to the invention on grounds of some preliminary experiments, even for quite special cases, such as impulse-cathodes or the like, thus ensuring the possibility of using the cathodes according to the invention in almost any electronic device where these advantages are essential.

Although what has been described above is believed at present to constitute some of the preferred technical and commercial embodiments of the inventive concept, based on what has been stated above, it will be obvious to those skilled in the art that many modifications and structural alterations thereof are possible without departing from the invention and sacrificing any advantages thereof. In the appended claims no modification of the invention is intended to be covered with the exclusions of other modifications thereof and the right to subsequently claim any modification eventually uncovered by these claims is expressly reserved.

What we claim is:

1. An indirectly heated supply cathode comprising, in combination, a hollow metallic cathode body; electrical heating means arranged in the interior of said cathode body and insulated from the latter; a supply of activating substance provided on the surface of the cathode body; migration body which is partially in heat-conducting contact with the cathode body and covers said supply of activating substance; said migration body consisting of several substantially non-porous members which are in contact with each other and made of high-melting metal; the members having therebetween flat surfaces and being arranged to provide between the members a tortuous marginal contact to provide a tortuous migration path extending from the supply material (interior) surface of the migration body to the opposite (outmost) surface of the migration body said migration body carrying on its outmost surface a layer of active material for emitting electrons, the thickness of said layer not exceeding that of a molecular layer; the migration body having a wall thickness not exceeding 50 microns; the thickness of the space available for receiving the supply material, between the surface of the cathode body and the interior surface of the migration body, having a practically uniform value of the same order of magnitude as the wall thickness of the migration body.

2. A supply cathode as claimed in claim 1, in which the cathode body carries the supply material in form of a layer of practically uniform thickness.

3. A supply cathode as claimed in claim 1, in which the cathode body is widened at both of its ends and carries the supply material only on its middle portion of smaller outer diameter.

4. A supply cathode as claimed in claim 1, in which the cathode body is cylindrical and in which the upper part of the cathode body is sealed by a part of the cathode body between the supply material and the heating means; said part of the cathode body forming the bottom of a cavity which contains supply material said cavity being covered by the migration body having a plane surface.

5. A supply cathode as claimed in claim 4, in which a trough-shaped cavity of the cathode body is covered by a migration body consisting of at least two perforated metal foils.

6. A supply cathode as claimed in claim 5, in which the metal foils of the migration body are fastened to the upper edge of the cathode body and are arranged in such a manner that their perforations are not in superposition.

7. A supply cathode as claimed in claim 5, in which the metal foils of the migration body are fastened to the conical wall portion of the cavity containing the supply material and are arranged in such a manner that the perforations of the foils are not in superposition.

8. A supply cathode according to claim 1, in which the migration body consists of helices of metal wire, in which the wires are closely wound so that the individual turns of each helix are in contact with each other and are arranged one above the other in such a manner that between the contacting turns of the helices of the individual helices the surface migration paths of the lowest helix are covered by the turns of the helices of the superimposed helices, whereby the individual turns of the helices of the superimposed helices are in contact with two turns of the helices of the lower helices.

9. A supply cathode as claimed in claim 8, in which the wire forming the helices is of band-shaped cross-section and the individual turns of the helices formed of such wire are in contact with each other by the narrow sides of the band-shaped cross-section.

10. A supply cathode as claimed in claim 1, in which the metal of the cathode body is selected from the group consisting of nickel, iron, nickel-containing alloys, iron-containing alloys and nickel plus iron-containing alloys.

11. A supply cathode as claimed in claim 1, in which at least one member of the migration body consists of a metal selected from the group consisting of nickel, tungsten, molybdenum, tantalum and niobium.

12. A supply cathode as claimed in claim 1, in which at least one member of the migration body consists of a metal selected from the group of platinum metals.

13. A supply cathode as claimed in claim 1, in which at least one member of the migration body consists of platinum.

14. A supply cathode as claimed in claim 1, in which the supply material contains an oxide of an alkaline-earth metal.

15. A supply cathode as claimed in claim 1, in which the supply material contains barium oxide.

16. A supply cathode as claimed in claim 1, in which the supply material contains a mixture of barium oxide, strontium oxide and calcium oxide.

17. A supply cathode as claimed in claim 16, in which the barium oxide, strontium oxide and calcium oxide are present in a molecular ratio of 2:1:2.

18. A supply cathode as claimed in claim 1, in which the supply material contains a compound of an alkaline earth metal with oxygen and with a metal selected from the group consisting of beryllium, zirconium, titanium, aluminum and rare earth metals.

19. A supply cathode as claimed in claim 1, in which the supply material contains a compound of an alkaline earth metal and a metallic reducing agent.

20. A supply cathode as claimed in claim 1, in which the supply material contains a barium compound and a metallic reducing agent.

21. A supply cathode as claimed in claim 1, in which the supply material contains an alloy of an alkaline-earth metal with at least one metal selected from the group consisting of beryllium, aluminum and rare earth metals.

22. A supply cathode as claimed in claim 21, in which the alkaline-earth metal is barium and the rare earth metals are scandium, yttrium and lanthanum.

23. A supply cathode as claimed in claim 1, in which the supply material contains a compound of an alkaline-earth metal and at least one metallic part of the cathode, which is in contact with said supply material, consists of a metal which is capable of acting as a reducing agent on said alkaline-earth metal compound.

24. An electron discharge tube comprising a cathode according to claim 1.

25. A radio receiving tube comprising a cathode according to claim 1.

References Cited in the file of this patent

UNITED STATES PATENTS

| | | |
|---|---|---|
| 1,891,074 | Winter | Dec. 13, 1932 |
| 2,175,345 | Gaidies | Oct. 10, 1939 |
| 2,177,703 | Francis | Oct. 31, 1939 |
| 2,543,728 | Lemmens | Feb. 27, 1951 |
| 2,624,024 | Jansen | Dec. 30, 1952 |
| 2,700,118 | Hughes | Jan. 18, 1955 |
| 2,761,993 | Katz | Sept. 4, 1956 |